Patented Mar. 10, 1925.

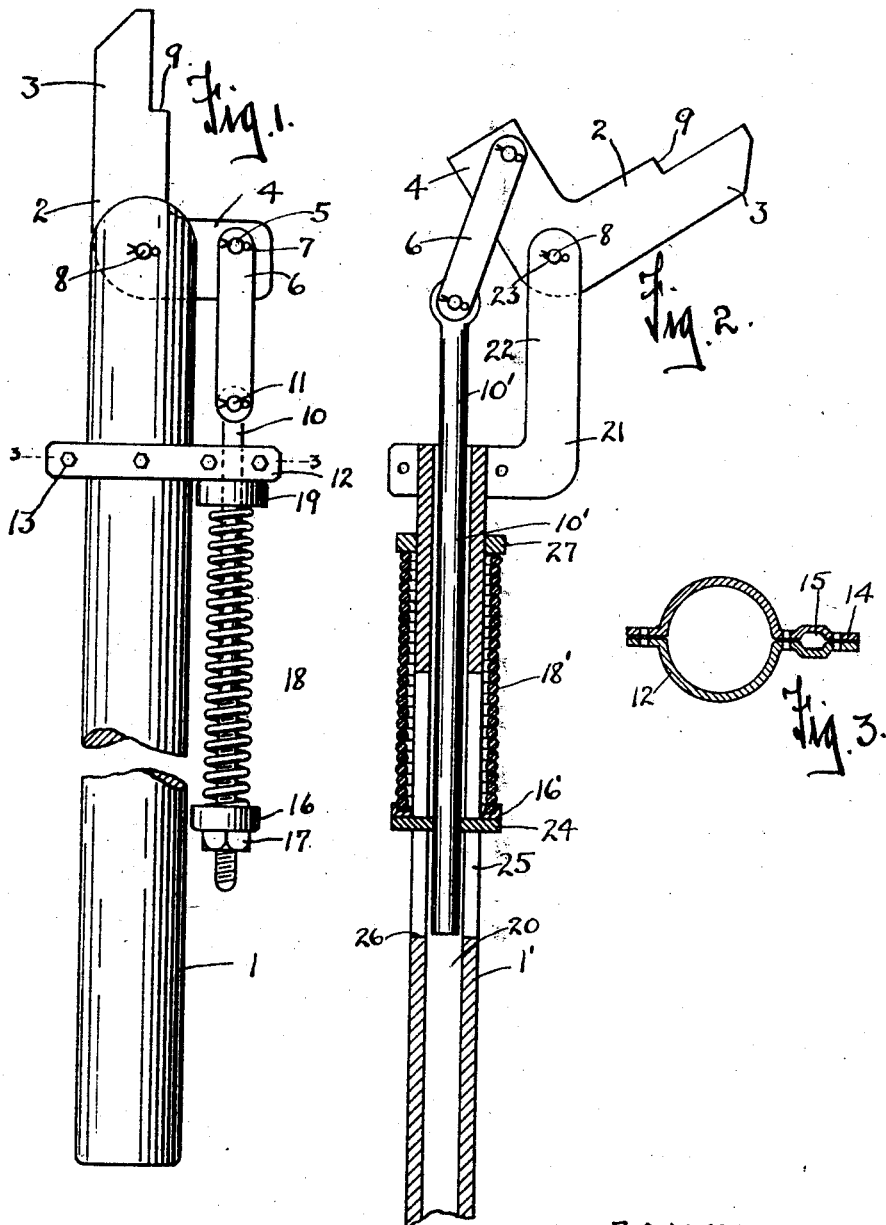

1,529,029

UNITED STATES PATENT OFFICE.

ROBERT A. LINCOLN, OF TONKAWA, OKLAHOMA, AND WILL I. LEWIS, OF HOUSTON, TEXAS.

MAKE-UP POST.

Application filed June 18, 1923. Serial No. 646,142.

*To all whom it may concern:*

Be it known that we, ROBERT A. LINCOLN and WILL I. LEWIS, citizens of the United States, residing at Tonkawa, Kay County, Oklahoma, and Houston, Harris County, Texas, respectively, have invented a certain new and useful Improvement in Make-Up Posts, of which the following is a full, clear, and exact description, such as will enable others skilled in the art to which it appertains to make and use the same.

Our invention relates to an improved make-up post for use on the rotary table used in drilling deep wells under the rotary system of drilling.

In the drilling of wells for oil, water, gas, and the like it is necessary at intervals to remove the drillstem, or other pipe, from the well and to again insert it back into the same. In handling the pipe during the time it is being inserted into or removed from the well, it is necessary to unscrew the couplings at the joints of the pipe while coming out of the hole and to again screw up these joints while the drillstem is being again assembled.

It is the object of our invention to provide a make-up post to be set in a socket provided therefor in the table of the rotary, against which the handle of the pipe tongs may contact while the rotary table is being used to screw up the joints as the drill stem is assembled.

Another object is to provide a post of this type which will automatically trip so as to release the handle of the wrench when the joint has been completely screwed up.

Another object is to prevent the mutilation of the pipe being handled by releasing the wrench, or pipe tongs, secured to the pipe when undue strain is placed upon the make-up post.

Other objects and advantages will be apparent from the description which follows and the points of novelty will be set forth with greater particularity in the claims appended hereto.

Referring to the drawings, wherein two separate embodiments of our invention have been shown, Fig. 1 is a side elevation of a make-up post showing one form of our invention; Fig. 2 is a similar view partly in central longitudinal section, illustrating a slightly different embodiment, and Fig. 3 is a transverse section of the bracket employed in the first embodiment, said bracket being cut on the line 3—3 of Fig. 1.

The construction of our invention is exceedingly simple, there being an upright post or pin 1, of sufficient strength to withstand the ordinary strain imposed thereon, the lower end being of suitable size to fit within the socket provided therefor in the rotary table, not shown. The upper end of the pin is provided with a diametrical slot which furnishes attachment for a bell crank lever, 2. This lever is made up of a flat plate, having an upper arm 3, which normally extends in a vertical direction. A lower arm 4 thereon is bent at right angles to the arm 3 and is provided with an opening to receive a pin 5 to which is connected a pair of links 6. Said pin 5 is secured in place by means of a cotter pin 7, or other well-known means. The bell crank lever 2 is secured within the slot at the upper end of the pin or post by means of a pin, 8, extending diametrically through the upper end of the post and through the lever, approximately centrally of the angular portion of the lever. The upper end of the arm 3 has a shoulder 9 formed thereon upon which the handle of a pipe wrench may rest.

The two links 6, pivoted to the arm 4 of the lever, are adapted to extend downwardly for a short distance and be pivotally connected to the upper end of a rod, 10, by means of a pivot pin, 11. The rod 10 extends downwardly for some distance and is held in position parallel to the post by means of a bracket 12. This bracket, as shown in Fig. 3, surrounds the post and is adapted to be clamped thereto by means of bolts or screws, 13, extending through the two cooperating parts making up the bracket. A lateral arm 14 on the bracket has therein an opening 15 through which the rod may reciprocate. The lower end of the rod 10 is threaded for some distance and has a cup-shaped washer 16 thereon, held in place by means of a nut 17 below said washer. The cup 16 is adapted to support a spiral spring, 18, which is under slight compression and bears at its upper end against a cup-shaped washer 19, held by the spring against the lower side of the bracket 12. This spring is of sufficient strength, and so adjusted that under normal conditions it will hold the arm 3 of the lever in upright position and will resist any force tending to move the arm 3 away from the vertical. It is so calibrated, however, that when the force bearing upon the arm 3 becomes greater than the predetermined amount, the spring will be compressed upwardly, allowing the rod and links to be drawn in an upward direction and allowing the lever to swing to one side, as shown at the upper end of Fig. 2.

In the use of this device, the drill collar, or other part to be screwed up, will be held by means of a wrench, the handle of which will bear against the arm 3 and be supported upon the shoulder 9 of the lever. The wrench will be rotated about the pipe by operating the rotary table in which the post or pin 1 is seated. The arm 3 bearing against the handle of the wrench will swing it about the joint, tending to screw up the coupling. When the coupling has been screwed tightly the force of the rotating table will frequently carry the rotary further than should safely be done. The wrench then bearing against the arm 3 will stop abruptly and the load exerted against the lever 3 will tend to throw it over against the action of the spring 18 and allow the wrench handle to pass by thus releasing the wrench and avoiding injury to the pipe.

In Fig. 2 we have shown a separate embodiment, which, under certain circumstances may be preferable to the modification first described. The post or pin 1' in this case is made up of a piece of strong pipe and the passage 20 therethrough provides a housing in which the rod 10' may move. A lever 2 is supported, in this embodiment, upon a bracket 21 clamped to the upper end of the post or pin and having an upwardly-extending arm 22 thereon, said arm being perforated at 23 to allow the passage of the pivot pin 8 therethrough. The arm 4 of the lever extends normally to a point directly over the passage 20 through the pipe allowing the rod 10' to extend directly downwardly into the post. The lower end of the rod or shaft 10' is pierced by a diametrical pin 24 which extends radially outward through slots 25 in the side walls of the post. These slots have a lower shoulder 26 to limit the downward movement of the pin 24 in the slots. Above the pin 24 is a cup-shaped washer 16' to receive the lower end of the spring 18', which, in this embodiment, is large enough to surround the post. The upper end of the spring bears against a collar 27 which is secured firmly to the post itself.

It will be noted that the operation of this second embodiment is practically identical with that of the first embodiment. The exerting of a sufficient pressure against the arm 2 will cause this arm to be thrown laterally against the action of the spring 18' and thus release the handle of the wrench.

In both of these embodiments the size of the springs and the tension thereon are adjusted by experiment to certain predetermined amounts, and these amounts are great enough so that the ordinary force of screwing up a joint will not be sufficient to overcome the tension of the spring, but as soon as the joint is screwed up so that a great enough force is thereby exerted upon the arm of the lever it will be sufficient to throw the lever to one side, releasing the wrench before the wrench can mutilate the pipe to which it is attached, or screw up the joint of the pipe excessively so as to injure the threads at the joint. We have, therefore, an automatic tripping make-up post which will be a safety provision against mutilation of the pipe in screwing up the joints while going into the hole. Other objects and advantages of the device will be apparent to one skilled in the art, without further description.

What we claim as new and desire to protect by Letters Patent, is:

1. A make-up post for rotaries comprising an upright pin, a rod, a bell-crank lever pivoted to said pin, one arm of said lever being normally vertical, the other arm being pivotally connected to said rod, and a spring connected to said rod and acting to hold said rod from movement upwardly with a predetermined pressure.

2. A make-up post for rotaries comprising an upright pin, a bell-crank lever pivotally attached to the upper end of said pin, one arm of said lever being presented upwardly to form a stop, a rod pivoted to the other end of said lever, a spring around said rod, a stop on said pin for the upper end of said spring and a ring on the lower end of said rod to support said spring, said spring being formed to support a predetermined pressure.

3. A make-up post for rotaries comprising an upright pin, a lever pivotally attached to the upper end of said pin, a spring connected with said lever normally tending to hold said lever in upright position, said spring being adjusted to allow the movement of said lever under a predetermined load.

4. A make-up post for rotaries comprising an upright pin, a bell-crank lever pivoted at the upper end of said pin, one arm of said lever being held normally in vertical position, a rod extending downwardly from the other arm of said lever, and a spring surrounding the said rod, said spring being so calibrated and adjusted as to prevent the movement of said lever under normal operating loads.

5. A make-up post for rotaries comprising a post, an arm on the upper end of said post and means to support said arm normally in a vertical position, said means adapted to allow the movement of said arm under a predetermined load.

6. A make-up post for rotaries comprising a post, a bell crank lever pivoted on the upper end of said post and means secured to an arm of said lever adapted to hold the other arm resiliently upward with a predetermined pressure.

7. A make-up post for rotary well drilling apparatus comprising a post, and a yieldable tong engaging member carried by the post arranged to automatically release the tong when the tong offers a predetermined resistance to turning.

8. A make-up post for rotary well drilling apparatus comprising a post, a tong engaging member carried by the post and movable thereon into and out of tong engaging position, and means for yieldably holding the tong engaging member in tong engaging position.

9. A make-up post for rotary well drilling apparatus comprising a post, a tong engaging member pivotally carried on the post adapted to be swung into and out of tong engaging position, and means for yieldably holding the tong engaging member in tong engaging position.

10. A make-up post for rotary well drilling apparatus comprising a post, a tong engaging member pivotally carried at the top of the post, and means for yieldably holding said member in a substantially vertical tong engaging position.

11. A make-up post for rotary well drilling apparatus comprising a post, a two-armed lever pivotally carried at the top of the post, one arm of said lever being a tong engaging arm, and means engaging the other arm for yieldably holding the tong engaging arm in a normal tong engaging position.

12. A make-up post for rotary well drilling apparatus comprising a post, a two-armed lever pivotally carried at the top of the post, one arm of said lever being a tong engaging arm, and means engaging the other arm for yieldably holding the tong engaging arm in a normal tong engaging position, said means including a spring.

13. A make-up post for rotary well drilling apparatus comprising a post, a two-armed lever pivotally carried at the top of the post, one arm of said lever being a tong engaging arm, means engaging the other arm for yieldably holding the tong engaging arm in a normal tong engaging position, said means including a spring, and means for adjusting the effective action of the spring.

14. A make-up post having tong engaging means thereon arranged to be forced from tong engaging position when the resistance offered by a tong exceeds a predetermined amount.

15. A make-up post having tong engaging means thereon arranged to be forced from tong engaging position when the resistance offered by a tong exceeds a predetermined amount, and means for returning the tong engaging means to tong engaging position.

In testimony whereof we hereunto affix our signatures, this the 26 day of April, A. D., 1923.

ROBERT A. LINCOLN.
WILL I. LEWIS.